US008540463B2

(12) United States Patent
Goulbourne

(10) Patent No.: US 8,540,463 B2
(45) Date of Patent: Sep. 24, 2013

(54) TWIST DRILL

(75) Inventor: David Goulbourne, Sheffield (GB)

(73) Assignee: Dormer Tools Limited, Nottinghamshire (GB)

( * ) Notice: Subject to any disclaimer, the term of this patent is extended or adjusted under 35 U.S.C. 154(b) by 866 days.

(21) Appl. No.: 11/996,716

(22) PCT Filed: Aug. 2, 2006

(86) PCT No.: PCT/GB2006/002890
§ 371 (c)(1),
(2), (4) Date: Oct. 1, 2008

(87) PCT Pub. No.: WO2007/015095
PCT Pub. Date: Feb. 8, 2007

(65) Prior Publication Data
US 2009/0087275 A1    Apr. 2, 2009

(30) Foreign Application Priority Data

Aug. 2, 2005   (GB) .................................. 0515898.5

(51) Int. Cl.
*B23B 51/02* (2006.01)
(52) U.S. Cl.
USPC ........... 408/144; 408/145; 408/211; 408/224; 408/230
(58) Field of Classification Search
USPC ................. 408/211–213, 223–225, 227, 229, 408/230, 144, 145
IPC ...................................................... B23B 51/02
See application file for complete search history.

(56) References Cited

U.S. PATENT DOCUMENTS

| 2,230,645 | A | * | 2/1941 | Jones | 408/212 |
| 2,600,286 | A | * | 6/1952 | Weiland | 408/211 |
| 2,613,710 | A | * | 10/1952 | Emmons | 408/213 |
| 2,652,083 | A | * | 9/1953 | Emmons | 408/211 |
| 4,209,275 | A | * | 6/1980 | Kim | 408/211 |
| 4,529,341 | A | | 7/1985 | Greene | |

(Continued)

FOREIGN PATENT DOCUMENTS

DE   19 807 609   6/1999
DE   101 06 035   8/2002

(Continued)

OTHER PUBLICATIONS

Ordinarzev et al., The Reference Book of a Toolmaker, 1987, pp. 358-360, Leningrad (St. Petersburg), Russia.

(Continued)

*Primary Examiner* — Eric A Gates
(74) *Attorney, Agent, or Firm* — Stites & Harbison PLLC; Marvin Petry

(57) ABSTRACT

A metal-working twist drill is provided with inner cutting edges that form a point (18) having an angle, A, of 130°. An outer, peripheral, part of each cutting edge (55, 57) forms an outer cutting portion (59, 61). The outer cutting portions slope in the opposite direction to the corresponding inner cutting edges and form an angle B, of 3° with respect to a plane normal to the axis of rotation of the twist drill. The width of the outer cutting portion, D as measured at the cutting edge, is 10.5% of the diameter of the twist drill. The metal-working twist drill produces bores having a reduced exit burr height.

17 Claims, 5 Drawing Sheets

(56) References Cited

U.S. PATENT DOCUMENTS

| | | | |
|---|---|---|---|
| 4,565,473 A | 1/1986 | Hosoi | |
| 4,645,389 A * | 2/1987 | Maier | 408/230 |
| 4,968,193 A * | 11/1990 | Chaconas et al. | 408/211 |
| 5,056,967 A | 10/1991 | Hageman | |
| 5,078,554 A | 1/1992 | Kubota | |
| 5,273,380 A | 12/1993 | Musacchia | |
| 5,288,183 A | 2/1994 | Chaconas et al. | |
| 5,731,046 A | 3/1998 | Mistry et al. | |
| 5,980,166 A | 11/1999 | Ogura | |
| 6,050,754 A * | 4/2000 | Thomas | 408/230 |
| 6,113,321 A | 9/2000 | Mulroy et al. | |
| 6,585,460 B1 | 7/2003 | Meece et al. | |
| 6,857,832 B2 * | 2/2005 | Nygård | 408/211 |
| 7,201,544 B2 * | 4/2007 | Nakashima et al. | 408/230 |
| 7,267,514 B2 * | 9/2007 | Wetzl et al. | 408/225 |
| 7,367,758 B2 * | 5/2008 | Turrini et al. | 408/230 |
| 7,516,686 B2 * | 4/2009 | Wang et al. | 76/108.6 |
| 2002/0044843 A1 | 4/2002 | Suzuki et al. | |
| 2004/0191016 A1 * | 9/2004 | Hintze et al. | 408/67 |
| 2005/0053438 A1 * | 3/2005 | Wetzl et al. | 408/225 |
| 2005/0053439 A1 * | 3/2005 | Wang et al. | 408/230 |
| 2009/0028654 A1 * | 1/2009 | Turrini | 408/1 R |
| 2009/0279965 A1 * | 11/2009 | Soittu | 408/59 |

FOREIGN PATENT DOCUMENTS

| | | | |
|---|---|---|---|
| DE | 10106035 A1 * | 8/2002 | |
| DE | 20211592 | 4/2004 | |
| EP | 0 137 898 | 4/1985 | |
| EP | 0 901 860 | 3/1999 | |
| EP | 0 893 185 | 8/2003 | |
| EP | 1 926 567 | 6/2011 | |
| GB | 2184046 | 6/1987 | |
| JP | 57-071714 | 5/1982 | |
| JP | 59-148206 | 10/1984 | |
| JP | 02-237709 | 9/1990 | |
| JP | 02237711 A * | 9/1990 | |
| JP | 02237712 A * | 9/1990 | |
| JP | 03-117507 | 5/1991 | |
| JP | 2000-005914 | 1/2000 | |
| JP | 2001-252806 | 9/2001 | |
| JP | 2002-326109 | 11/2002 | |
| JP | 2003-220507 | 8/2003 | |
| SU | 1238905 | 6/1986 | |

OTHER PUBLICATIONS

Rospatent, Federal Institute of Industrial Property of the Federal Service for Intellectual Property, Patents and Trademarks, Official Action for Russian Application No. 2008107969.02 (008621).

Japanese Notice of Rejection for Japanese Patent Application No. P2008-524586, Jan. 10, 2012, Japanese Patent Office, Production Machinery Section of Patent Examination, Division 2.

Notice of Opposition for European Patent Application No. 1 926 567, Mar. 8, 2012, European Patent Office, Munich, Germany.

Tsao, C.C. et al.: "Taguchi analysis of delimination associated with various drill bits in drilling of composite materials", International Journal of Machine & Manufacturing, 2004.

Mazoff, Joe: "Choose the Best Drill Point Geometry", Modern Machine Shop, Jan. 13, 2004.

Wu, S.M. et al.: "Mathematical Model for Multifacet Drills", Journal of Engineering for Industry, 1983.

Tsao, C.C. et al.: "Effect of eccentricity of twist drill and candle stick drill on delimination in drilling composite materials", International Journal of Machine &.Manufacturing, Oct. 6, 2004.

Hocheng, H. et al.: "Comprehensive analysis of delamination in drilling of composite materials with various drill bits", Journal of Materials Processing Technology, 2003.

\* cited by examiner

TWIST DRILL

The present invention relates to twist drills, in particular fluted carbide twist drills for cutting metals and composites.

Twist drills (also known as twist drill bits) include a shank at one end for attachment to a device for rotating the drill (e.g. a drill chuck) and at the opposite end, a cutting tip having a cutting edge, for cutting into the material that is to be bored or machined (i.e. the work piece). In the case of metal-working twist drills for drilling metal work pieces the cutting edge typically extends substantially radially from a central part of the cutting tip to the outer edge of the cutting tip. In between the shank and the tip there is usually a fluted body portion that provides stability to the twist drill as it forms a bore and assists in removing the excavated material from the bore.

A vast number of twist drill designs are known and the geometry of the cutting tip is tailored for specific work pieces. For example, twist drills for wood have a different geometry to those used for metal work pieces. It is recognised that even small changes in geometry can significantly affect performance.

Within the specific sub-class of twist drills for metal-working, it is known that when a bore is created by a twist drill, some of the material removed from the work piece (i.e. the material being drilled) to form the bore is plasticised due to the localised high temperatures and pressures experienced at the cutting edge. The plasticised material flows to the outer edges of the bore and is effectively 'extruded' past the edges of the drill to form an exit burr around the circumference of the exit opening of the bore. In addition, a 'burr cap' of material is often formed as the cutting tip of the drill 'breaks through' the work piece.

An example of a conventional carbide metal-working twist drill for drilling metal work pieces is shown in FIGS. 1A and 1B. The cutting tip 1 of the twist drill has in a central portion a chisel edge 3 formed between web thinnings 4. Cutting edges 5,7 extend from an inner part of the cutting tip where they are joined to respective ends of the chisel edge 3, to the outermost edge of the cutting tip. First and second facets 9,11 (also known as first and second or primary and secondary clearances) extend behind the cutting edges to provide clearance for the cutting edge. The chisel edge 3 is formed during grinding of the facets.

The cutting edges 5,7 and first and second facets (clearances) 9,11 form a 'point' 17 having an angle of about 130°. When the drill is rotated, the chisel edge 3 extrudes the metal work piece and cutting edges 5,7 cut into the material of the work piece.

The twist drill also has a cylindrical land or margin 13 on the outermost side of the twist drill to support the drill in use.

The 'point' 17 and the cylindrical land 13 are characteristic of metal-working twist drills and these features are not normally found on other types of twist drill.

Holes 15 extend through the twist drill and allow cutting fluid to be delivered to the cutting edges 5,7 during use. These holes or conduits are characteristic of some metal-working twist drills.

The twist drill is fluted and rake face 19 causes machined material that has been cut away from the work piece (also known as 'chip') to be directed into the flutes, which in turn move the material away from the cutting tip and out of the bore.

During use the cutting edges 5,7 simultaneously engage the work piece that is to be drilled. As discussed above, as the cutting tip (i.e. point 17) 'breaks through' the surface of the work piece, high temperatures and pressures are created at the cutting edge. This causes plasticisation of the work piece material. This plasticisation can occur in metal or metal-containing work pieces (e.g. Al, Ti, Ni, steel, stainless steel and alloys and combinations thereof). A similar, related problem of fibre pull-out can occur in certain composites such as carbon fibre and glass fibre reinforced plastic work pieces. There is also a problem of burr, fibre pull-out and de-lamination in work pieces that include two or more layers of different material e.g. metal and composite (e.g. carbon fibre reinforced plastic) layers in the same work piece.

Plasticised material formed at the cutting edge does not behave in the same way as normal 'chips' and it is not readily deflected into the helical flutes by the rake faces 19. Instead, it can flow to the outer edge of the cutting tip at the sides of the rotating drill, where it cools and forms an exit burr. A similar mechanism can also cause burr caps. Examples of exit burr and burr caps produced by known metal-working twist drills are shown in FIG. 3A.

The presence of exit burr and/or burr caps on the work piece is highly undesirable because it requires further machining, or de-burring, to remove the excess material. This can add an entire step to a manufacturing process, with the resultant increase in production complexity and costs. This is a particular problem with hard metal and metal-containing work pieces.

Several attempts have been made to address this problem, but they have failed to significantly reduce exit burr to an acceptable level, and/or have had at least some detrimental effect on the performance of the tool. For example, it has been suggested that a chamfer should be applied to the outer circumferential edge of the cutting tip or that the point angle of the cutting tip should be increased (to make a 'flatter' point). In both cases, exit burr is still a problem.

A further attempt at reducing burr involves providing a cutting edge that has an outer part that is turned inward towards the centre of the cutting tip to form an acute angle relative to the outer periphery of the drill as seen from the axial direction of the drill (U.S. Pat. No. 5,078,554). This acute angle feature is said to cause machined material to be directed to the centre of the machined bore. Thus, this approach does not directly address the problem of plasticisation of machined material, rather it seeks to redirect the plasticised material. The 'acute angle' feature is more prone to damage.

The present invention seeks to address the problem of formation of exit burr and burr caps whilst maintaining drill performance.

At its most general, the present invention proposes that a cutting edge of a metal-working twist drill (e.g. for drilling steel) should have an outer cutting portion that is inclined in the opposite direction to the 'point' formed by inner portions of the cutting edge, so that the plasticisation of the substrate is reduced and the flow of plasticised material is disrupted.

In a first aspect, the present invention provides a twist drill having
  a shank,
  an axis of rotation about which the twist drill rotates during use, and
  a cutting tip, the cutting tip having a cutting edge, wherein
    an inner cutting portion of the cutting edge forms a point, the point angle being in the range 110° to 160°, characterised in that a radially outer part of the cutting edge includes
    an outer cutting portion that is inclined in the opposite axial direction to the inner cutting portion.

In this arrangement, the outer cutting portion can be thought of as having a 'negative' angle in the axial direction because the slope is opposite to that of the rest of the cutting edge (i.e. the point formed by the inner cutting portion), which by convention is normally regarded as having a positive angle.

Suitably, the shank includes a rearward attachment end for engagement with means for rotating the twist drill, and it follows that the cutting tip is located at the forward end of the drill.

Suitably, a radially outer part of the outer cutting portion is axially spaced in a forward direction with respect to a radially inner part of the outer cutting portion.

The terms 'point' and 'point angle' are familiar to the person skilled in the art, as is the fact that point angles are regarded as positive, by convention. For example the point angle of an embodiment of the present invention is shown as feature A in FIG. 2B. For the avoidance of doubt the point angle is the included angle between the primary and secondary cutting edges projected upon a plane parallel to the drill axis and parallel to the two cutting edges.

The term 'body' is familiar to the person skilled in the art. For the avoidance of doubt, the body is the portion of the drill extending from the extreme cutting end to the commencement of the shank.

The terms 'forward' and 'rearward' as used herein are intended only to assist in the understanding of the structural features of the twist drill. They are not intended to be a reference or limitation to the drill in use.

Preferably the cutting tip includes 2 or more cutting edges (e.g. 2, 3, 4, 5, or 6 cutting edges). Most preferably there are only 2 cutting edges, i.e. primary and secondary cutting edges.

Suitably, each cutting edge includes an inner cutting portion that forms the point. Preferably each cutting edge includes an outer cutting portion.

Suitably, a shallow V-shaped 'valley' or 'trough' is formed between the inner cutting portion and the outer cutting portion. This valley or trough formed because of the opposite slopes of the inner cutting portion and the outer cutting portion (i.e. as a result of the 'dishing' of the outer cutting portion), may help direct waste material from the bore away from the edges of the tool and into the flutes of the drill. It is also believed that the outer cutting portion breaks up or interferes with the plasticisation and flow of the work piece material as the drill breaks through the work piece surface.

It is preferred that the cutting edge is continuous, i.e. that the outer cutting portion is part of the cutting edge that extends continuously (unbroken) from an inner to an outer part of the cutting tip. Suitably, the inner cutting portion and the outer cutting portion are joined.

The radially outermost part of the outer cutting portion is preferably located on the outer peripheral edge of the cutting tip. Suitably the twist drill includes a cylindrical land (also known as the margin), for providing stability and support when drilling into the work piece, in particular hard work pieces such as steel. Preferably, the outer cutting portion extends to the outermost edge (periphery) of the cylindrical land.

The twist drill can include double cylindrical lands—one on the leading edge of the flutes and one on the trailing edge of the flutes. This improves stability and support.

Furthermore, it is preferred that the combined length of the inner and outer cutting portions is at least as long as the diameter of the body of the twist drill.

Embodiments of the present invention are believed to reduce the pressure on the work piece material as the twist drill breaks through the surface of the work piece. Embodiments may also bring about a lower temperature at the cutting edge, compared to conventional twist drills. Test results indicate that these beneficial effects are caused by the outer cutting portion. In particular, it is thought that the 'negative' angle ('dishing' angle) of the outer cutting portion is responsible for these improvements. It is also believed that the 'valley' or 'trough' not only lowers the pressure at the cutting tip and/or results in a more favourable distribution of pressure, but also assists in breaking up or interfering with the plasticisation and flow of the work piece material as the twist drill breaks through the work piece surface.

In any case, embodiments of the present invention produce bores having a reduced exit burr height as discussed more fully later. Furthermore, even if embodiments of the present invention produce an exit burr cap, it is removed more easily compared to burr caps produced by known metal-working twist drills because the thickness of the material connecting the burr cap to the wall of the bore is much reduced.

The outer cutting portion is preferably inclined at an angle of from 1° to 15° with respect to a plane normal to the axis of rotation of the tool, more preferably 2° to 10°, even more preferably 2° to <10°, even more preferably 2° to 8°, even more preferably 2° to 6°, even more preferably 2° to 5° and most preferably 2° to 4°. This angle is shown as feature B, between arrow B1 and B2, in FIG. 2B.

As mentioned above, the inclined outer cutting portion can, by convention, be regarded as having a negative angle (dishing angle). In which case, the preferred angles of the burr-reducing edge given above are negative angles.

Suitably the twist drill includes a chisel edge. In which case, preferably the inner ends of the cutting edges are joined to respective ends of the chisel edge.

Suitably the cutting tip includes web thinnings.

The point angle, indicated as feature A in FIG. 2B, can be in the range 110° to 155°, more preferably 115° to 150°, more preferably 115° to 145°, even more preferably 118° to 140° and most preferably about 130° to 140°. Indeed, a lower limit for the point angle can be selected from 110° 115°, 120°, 125°, 128° and 130° (i.e. there is a point angle of at least the selected value). An upper limit for the point angle can be selected (independently from a lower limit) from 140°, 145°, 150°, 155 and 160° (i.e. there is an angle of no more than the selected value).

These upper and lower limits can be applied individually or in any combination to define a range. Particularly preferred ranges include 128° to 160°, 128° to 155°, 128° to 150°, 128° to 145° and 128° to 140°. Other preferred ranges are 130° to 160°, 130° to 155°, 130° to 150° and 130° to 145°.

It is preferred that the width of the outer cutting portion is in the range of 5% to 50% of the diameter of the twist drill, more preferably in the range 5% to 40%, even more preferably 5% to 30%, even more preferably 5% to 20% and most preferably 10% to 20%.

More generally, the width of the outer cutting portion is preferably at least a value selected from 5%, 7.5%, 10%, 12.5%, 15% and 17.5% of the diameter of the twist drill. Preferably the width of the outer cutting portion is no more than a value selected from 12.5%, 15%, 17.5%, 20%, 22.5%, 25%, 27.5% and 30% of the diameter of the twist drill. These values can be applied individually or in any combination to define a range. Particularly preferred ranges include 5% to 17.5%, 5% to 15%, 5% to 12.5% and 5% to 10%. Also preferred are 7.5% to 15%, 7.5% to 12.5% and 7.5% to 10%.

For the avoidance of doubt, the width of the outer cutting portion is measured from the point at which the inner and outer cutting portions meet (i.e. the "valley" referred to above) to the outer tip of the outer cutting portion. This is indicated as feature D, between arrows D1 and D2, in FIG. 2A.

The width of the point (feature C in FIG. 2A) is preferably in the range 50% to 90% of the diameter of the drill. Preferably the width is at least a value selected from 50%, 55%, 60%, 65%, 70%, 75%, 80% and 85% of the diameter of the drill. Preferably the width is no more than a value selected from 75%, 80%, 85%, 90% and 95% of the diameter of the drill. These values can be applied individually or in any combination to define a range. Particularly preferred ranges include 70% to 95%, 70% to 90%, 70% to 85%, 70% to 80%. Also preferred are 75% to 95%, 75% to 90%, 75% to 85%. Also preferred are 80% to 95% and 80% to 90%.

The drill diameter is the diameter over the margins of a drill measured at the cutting tip.

The cutting edge, including the outer cutting portion, may have a straight profile in the radial direction, i.e. when viewed along the axis of rotation of the twist drill (looking end-on at the cutting tip). In other words, the cutting edge extends linearly from the inner part of the cutting tip to the outer part-(for example as is known from the cutting tip of FIG. 1A). However, the cutting edge profile can also be non-linear or curved. In certain preferred embodiments the cutting edge profile, in particular the profile of the inner cutting portion, is curved. It can be curved (or bowed) so that it is convex or concave. Preferably it is convex. Examples of convex cutting edges are given in GB2184046A, which is incorporated herein by reference, in particular the example shown in FIGS. 3 and 4 and described at page 1, lines 45 to 106 of GB2184046A.

In preferred embodiments the outer cutting portion shares the same profile in the radial direction (as viewed along the axis of rotation, i.e. end-on) as the rest of the cutting edge (e.g. the inner cutting portion). However, in alternative preferred arrangements the outer cutting portion has a profile in the radial direction that is different from the profile of the rest of the cutting edge. For example, in preferred embodiments the outer cutting portion forms an angle, in the radial direction, with the rest of the cutting edge (e.g. the inner cutting portion), when the cutting tip is viewed axially (end-on). For example, the outer cutting portion is inclined in the radial direction with respect to the inner cutting portion. The outer cutting portion may form an angle of less than 180° with the rest of the cutting edge, e.g. an angle in the range<180° to 140°. Preferred angles are in the range<180° to >160°. In this way the outer cutting portion may extend in front of the rest of the cutting edge, in the cutting direction of the twist drill.

In preferred embodiments, the cutting tip includes at least one flank face (also know as a facet or clearance) that extends behind the (preferably each) cutting edge in the opposite direction to the cutting direction, to provide clearance. Preferably the flank face forms a clearance angle of about 5° to 20°, preferably about 6° to 10°. Preferably the cutting tip includes two, also preferably three, facets/flank faces associated with the or each cutting edge. Suitably a second flank face extends behind the first flank face. Preferably the angle of the second flank face is about 10° to 30°, preferably about 17° to 25°.

Preferably the cutting tip has a first flank face that extends immediately behind the (preferably each) cutting edge to form a clearance angle of about 5° to 20°, preferably about 6° to 10°, and a second flank face that extends behind the first flank face to form a clearance angle of about 10° to 30°, preferably about 17° to 25°.

Preferably the twist drill includes one or more flank faces extending behind the outer cutting portion, in the opposite direction to the cutting direction. Suitably the clearance angle of such a flank face or faces is/are the same as those described above with respect to the first and second flank faces respectively. Typically, each of the inner and outer cutting portions have at least one flank face associated therewith. Preferably the flank face or faces associated with the outer cutting portion are tapered so that they get narrower at greater distances behind the outer cutting portion. Preferably the taper extends behind the outer cutting portion for a distance equivalent to about 5% to 40% of the circumference of the twist drill, more preferably about 5% to 20%. In certain embodiments this corresponds to flank face or faces length of about 1 mm to 10 mm, preferably about 1 mm to 5 mm.

Alternatively, the flank faces associated with the outer cutting portion can be untapered so that the edges of the flank face remain parallel.

Preferably the width of the flank face associated with the outer cutting portion, as measured at the outer cutting portion, is the same as the width of the outer cutting portion. In other words, the widest part of the flank face is preferably the same as the width of the outer cutting portion with which it is associated.

Preferably the twist drill has two or three helical flutes.

Preferably the twist drill has a diameter in the range 1 mm to 50 mm, preferably 1 to 20 mm, more preferably 1 mm to 15 mm, and most preferably 2 mm to 15 mm.

In a particularly preferred embodiment, the present invention provides a twist drill having
  a rearward attachment end for engagement with means for rotating the twist drill,
  an axis of rotation about which the twist drill rotates during use,
  a forward cutting tip, and
  a cylindrical land to provide body clearance,
the cutting tip including
  primary and secondary cutting edges, respective inner edges of which form a point, the point angle being in the range 115° to 155°, wherein a radially outer part of each of the primary and secondary cutting edges includes an outer cutting portion that is inclined in the opposite axially direction to the respective inner cutting portion, wherein the angle formed by the outer cutting portions with respect to a plane normal to the axis of rotation of the twist drill is in the range>2° to <10°, and the width of the outer cutting portions as measured at the cutting edge is in the range 5% to 30% of the diameter of the twist drill.

Preferably the width of the outer cutting portions is in the range 5% to 15% of the diameter of the twist drill.

In some embodiments the twist drill includes one or more channels or conduits for delivering coolant or lubricant to the cutting tip. Suitably these channels or conduits extend from the rearward end of the twist drill to the forward cutting tip.

In embodiments, the outer corner of the outer cutting portion is chamfered. This extends drill life. A chamfer radius of 0.2 to 0.8 mm, preferably 0.2 to 0.5 mm, is appropriate, depending on drill radius. The chamfer can be provided by an aside of about 45°.

Preferably the metal-working twist drill is made of carbide. A preferred carbide is tungsten carbide. Alternative materials of construction include high speed steel (HSS), HSCo and HSCoXP, silicon nitride and PCD (polycrystalline diamond), or combinations thereof (for example PCD mounted on a metal drill).

Preferably the twist drill is coated, partially or fully, with a surface coating such as titanium aluminium nitride (TiAlN). Preferably the coating is a wear resistant coating, suitably having a lower coefficient of friction than the uncoated tool. Other coatings include TiN, TiCN, AlTiN, DLC (diamond-like carbon), diamond and AlCrN.

In a further aspect, the present invention provides a twist drill having
- a shank,
- an axis of rotation about which the twist drill rotates during use,
- a cutting tip, the cutting tip having a cutting edge, wherein an inner cutting portion of the cutting edge forms a point, the point angle being in the range 110° to 160°, wherein a radially outer part of the cutting edge includes an outer cutting portion that is inclined in the opposite axial direction to the inner cutting portion,
- a cylindrical land wherein the outer cutting portion extends to the outermost edge of the cylindrical land,
- a primary flank face extending behind the cutting edge in the opposite direction to the cutting direction, and
- a secondary flank face extending behind the primary flank face in the opposite direction to the cutting direction.

The optional and preferred features of the first aspect may also apply to this aspect.

In a further aspect, the present invention provides a twist drill having
- a shank,
- an axis of rotation about which the twist drill rotates during use,
- a cutting tip, the cutting tip having a cutting edge, wherein and inner cutting portion of the cutting edge forms a point, the point angle being in the range 128° to 160°, wherein a radially outer part of the cutting edge includes an outer cutting portion that is inclined in the opposite axial direction to the inner cutting portion, and
- a cylindrical land wherein the outer cutting portion extends to the outermost edge of the cylindrical land.

Preferably the point angle is in the range 130° to 160°.

The optional and preferred features of the first aspect may also apply to this aspect.

In a further aspect, the present invention provides a method of manufacturing a twist drill for drilling metal substrates, including the steps of
(i) fluting a drill blank to produce a helical flute;
(ii) forming a cutting edge at the end of the flute, wherein an inner cutting portion of the cutting edge forms a point having a point angle in the range 110° to 160°; and
(iii) forming an outer cutting portion on a radially outer part of the cutting edge, wherein the outer cutting portion is inclined in the opposite axial direction to inner cutting portion.

Preferably step (i) includes forming 2 or 3 helical flutes. Preferably step (ii) includes forming a facet at the end of each flute, preferably to produce 2 or 3 cutting edges.

Alternatively, step (ii) includes applying a conical grind to the cutting tip to produce the cutting edge.

Preferably the step of forming a facet at the end of each flute includes the steps of forming a primary facet behind each cutting edge and, behind each primary facet, a secondary facet.

Preferably, the step of forming each facet includes grinding.

Preferably the step of forming the outer cutting portion includes forming a facet at a radially outer portion of the cutting edge. Alternatively, the outer cutting portion can be formed using a conical grind.

The optional and preferred features of the previous aspects also apply to this aspect.

In a further aspect, the present invention provides a method of modifying a twist drill having a cutting tip with a point having a point angle in the range 110° to 160°, wherein the method includes the step of forming an outer cutting portion on an outer part of the cutting edge, wherein the outer cutting portion is inclined in the opposite axial direction to an inner cutting portion of the cutting edge.

Preferably the step of forming an outer cutting portion includes reforming (preferably regrinding) the cutting edge of the twist drill. Suitably, this involves regrinding the primary and secondary facets.

Preferably the twist drill to be modified has primary and secondary cutting edges and a point angle in the range 115° to 155°.

The optional and preferred features of the previous aspects also apply to this aspect.

In a further aspect the present invention provides a method of drilling a laminate material wherein a twist drill according to any one of the previous aspects is used to drill the laminate material.

Thus, the present invention includes the use of twist drills according to any one of the previous aspects in a method of drilling a laminate material.

The twist drill of the present invention is particularly suitable for drilling into laminate (i.e. multilayered) materials because it reduced the problem of delamination.

Delamination or the pulling apart of layers, of a laminate material is a problem when conventional twist drills are used. In particular, the problem is significant for the aerospace industry that utilises "stack" material comprising carbon fibre-aluminium laminates (i.e. a layer of carbon fibre material and a layer of aluminium, sometimes known as CFRP/Al—carbon fibre reinforced plastics/AL). Furthermore, the carbon fibre layer frays and splinters on the entry side of the drill hole. Substantial exit burr is formed on the aluminium exit side.

Embodiments of the twist drills of the present invention not only reduce the problem of delamination, but they also reduce the problem of fraying and splintering of fibrous or fibre-containing material such as carbon fibre composites. Thus, in the method of the present invention the laminate material preferably comprises a fibre-containing layer, e.g. a carbon fibre-containing layer. Preferably the laminate material includes a metal-containing layer, e.g. an aluminium-containing layer. Suitably the laminate material comprises a fibre-containing layer and a metal containing layer (preferably a carbon fibre-containing layer and an aluminium-containing layer). It is particularly preferred that the laminate material is a CFRP/Al material—carbon fibre reinforced plastics/AL.

Suitably, drilling starts on the carbon fibre-containing layer (i.e. the entrance hole is on the carbon fibre-containing layer). Suitably the aluminium-containing layer is the last layer to be drilled (i.e. the exit hole is on the aluminium-containing layer).

The twist drills of the present invention are also particularly suitable for use with laminates comprising more than two layers, e.g. three, four, five or six layers.

In a further aspect, the present invention provides a method of drilling a fibre-containing material wherein a twist drill according to any one of the previous aspects is used to drill the fibre-containing material. As noted above, the twist drills of the present invention can reduce the problem of fraying and splintering of fibre-containing materials.

The optional and preferred features of any one aspect can also apply to any of the other aspects. Furthermore, any one aspect may be combined with one or more of the other aspects.

BRIEF DESCRIPTION OF THE FIGURES

Embodiments of the invention, tests and experiments illustrating the principles of the invention will now be described with reference to the accompanying drawings in which.

DETAILED DESCRIPTION OF EMBODIMENTS OF THE INVENTION AND SUPPORTING EXPERIMENTS

FIG. 1 shows the cutting end of a conventional twist drill, for example a CDX twist drill as manufactured by Dormer Tools (Sheffield) Ltd. This drill has already been discussed.

Figure 2A:
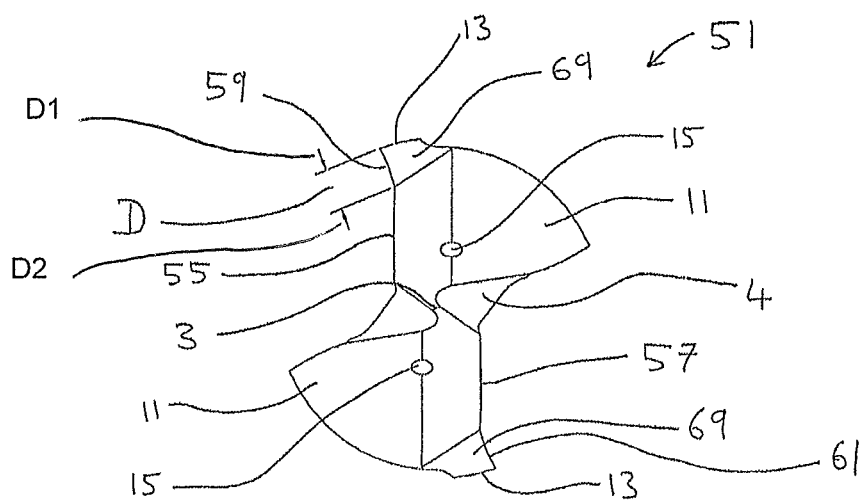
FIGS. 2A and 2B show a twist drill, being an embodiment of the present invention.
Figure 2B:
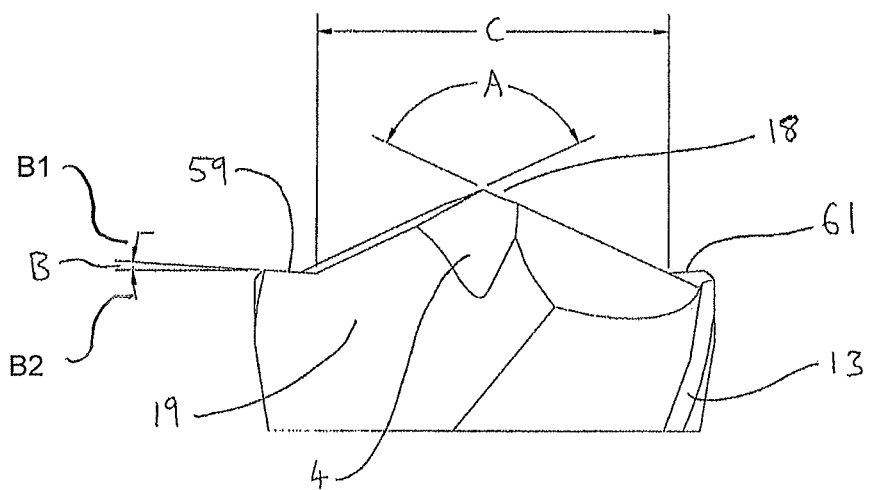

FIGS. 2A and 2B show an embodiment of the present invention in which the metal-working twist drill is made from carbide. Other materials are also possible, for example HSS, etc.

Figure 1A:
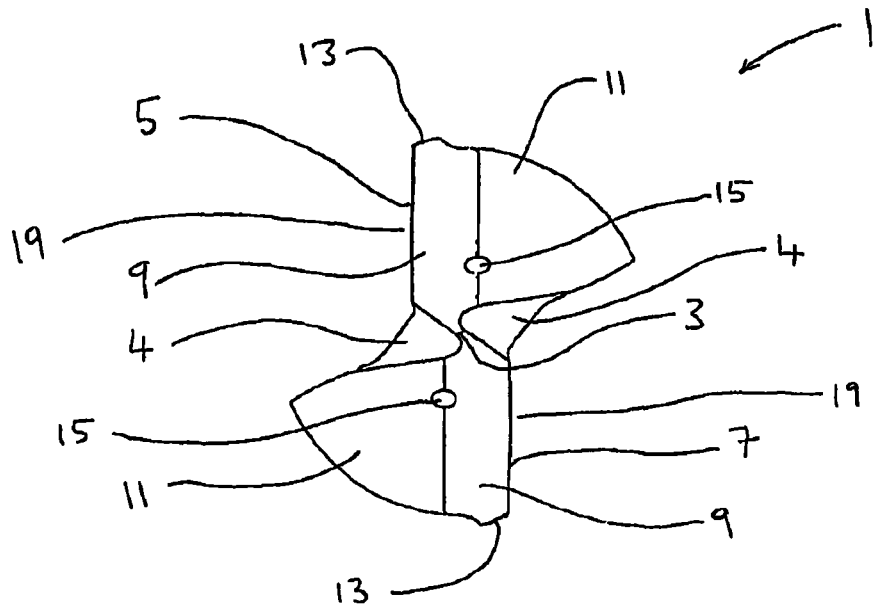
FIGS. 1A and 1B show a twist drill of the prior art.
Figure 1B:
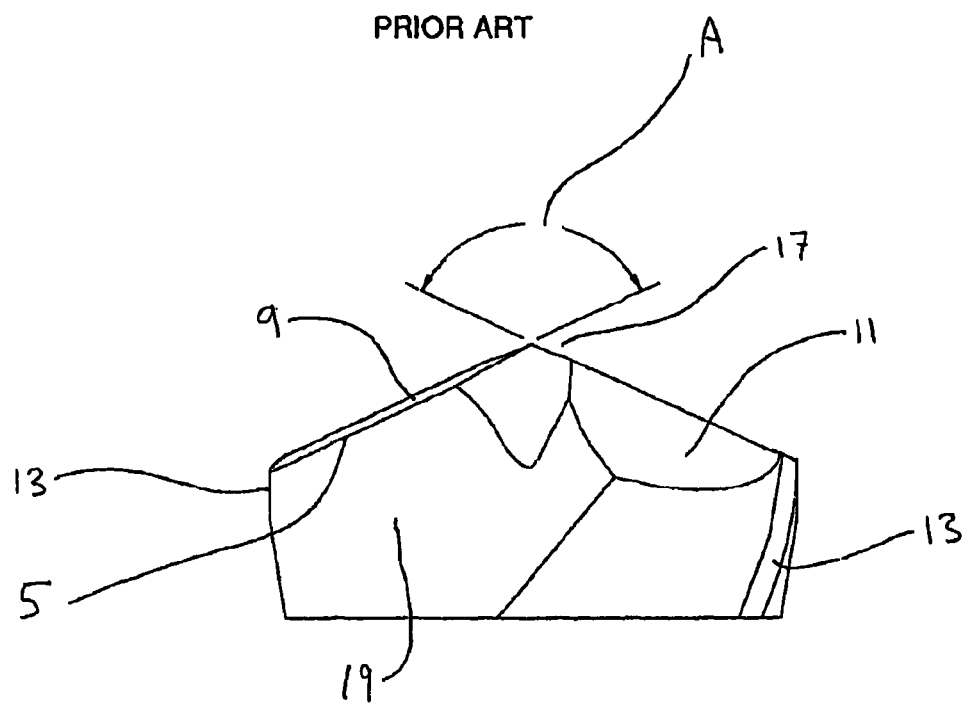

The cutting tip 51 of the twist drill has many features in common with the conventional twist drill shown in FIGS. 1A and 1B and the same reference numerals have been used to identify common features.

This embodiment differs from the conventional twist drill of FIG. 1 in that the cutting edges include inner cutting edges 55, 57 and, radially outwards of these inner portions, outer cutting portions 59, 61.

The inner cutting edges form a point 18 that has a 'positive' angle, A, in this case 130°. Other point angles can also be used, preferably in the range 115° to 155°.

On an outer, peripheral, part of each cutting edge 55,57 is a outer cutting portion 59,61. The outer cutting portions are inclined at an angle, B, of 3° with respect to a plane normal to the axis of rotation. Because the slope of the outer cutting portion has an opposite slope to the point angle, the angle of the outer cutting portion can be regarded as a negative angle, i.e. −3°. Other angles are also possible, preferably greater than 2° (−2°) and more preferably in the range >2° to 15°.

The width of the outer cutting portion, D, as measured at the cutting edge, is 10.5% of the diameter of the twist drill. Other widths are possible, preferably in the range 10% to 30%.

A third facet 69 extends behind each outer cutting portion, to provide clearance.

The width of the point, C, is 75% of the diameter of the twist drill. Other point widths are possible, preferably in the range 50% to 90%.

The profile of the inner cutting edge as viewed axially (end-on or plan view of the twist drill) is straight, just like the conventional twist drill of FIG. 1. However, in other preferred embodiments, the inner cutting edge has a bowed (suitably, convex) profile in the radial direction. In the embodiment shown in FIG. 2A, the profile of the outer cutting portion is curved such that the outer peripheral edge of the outer cutting portion lies in front of the rest of the cutting edge, i.e. in the direction of cutting. In other words, the curved outer cutting portion leads the cutting edge. Other profiles are possible, for example a straight cutting edge, or a curved inner cutting edge and straight outer cutting portion.

The cutting edge of this embodiment has been honed with a diamond grinding tool. Other known cutting edge finishing and honing techniques can also be used.

In this embodiment, the twist drill has a diameter of 6.0 mm. Other diameters are possible, preferably in the range 1 mm to 50 mm more preferably 1 to 20 mm.

Measurements of key structural features of the twist drill shown in FIGS. 2A and 2B are set out in the table below.

| Drill Ø - 6.0 mm | | |
|---|---|---|
| Item | Nom. | Tolerance |
| A | 130 | ±2° |
| B | −3° | ±1° |
| C | 4.50 | ±0.05 |
| D | 0.63 | ±0.10 |

Method of Making Twist Drill

The following method illustrates how an embodiment of the present invention can be made.

A drill blank was subjected to the following machining and grinding steps:

Formation of double helical flutes
Grinding of body clearance (i.e. forming margin 13)
Grinding of Secondary Clearance (11)
Grinding of Primary Clearance (9)
Grinding of Third Facet (69) on Primary Clearance (9)
Grinding of Thinning (4)
Honing of Cutting Edges (55, 57, 59 and 61)

Method of Modifying Conventional Twist Drill

A conventional CDX drill, available from Dormer Tools (Sheffield) Ltd, was regrinded to form an outer cutting portion as shown in FIGS. 2A and 2B.

Figure 3A:
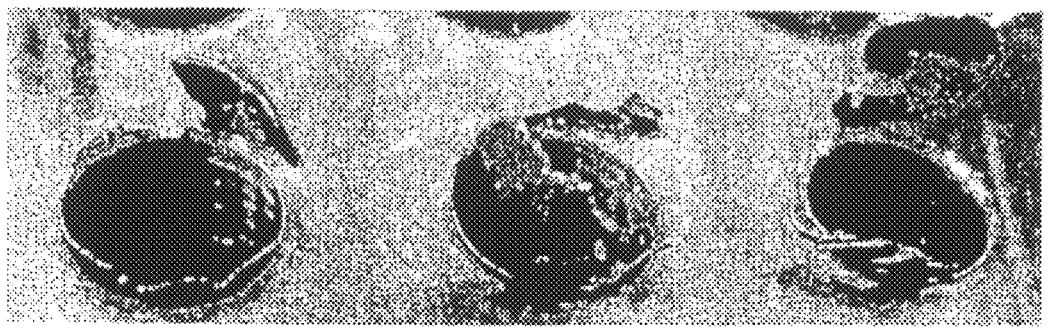
FIGS. 3A and 3B show the results of an exit burr test for a twist drill of the prior art (FIG. 3A) and a twist drill of the present invention (FIG. 3B)
Figure 3B:
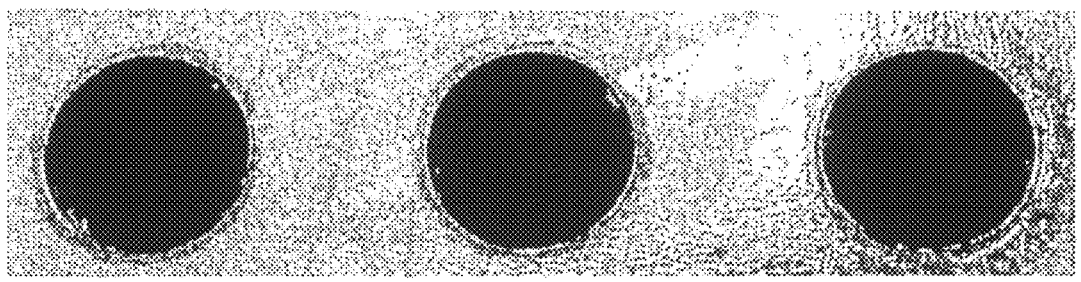

The procedure was as set out above for making the twist drill, except that there was no need to form the flutes or body clearance. The regrind therefore comprised regrinding the primary and secondary facets, followed by grinding of the third facet, to form the outer cutting portion Burr Height Studies Twist drills of the present invention have proven successful in the reduction of exit burr height. FIG. 3A shows the exit burr created when a conventional metal-working twist drill (in this case, a CDX drill available from Dormer Tools (Sheffield) Ltd) was used to drill holes in a steel work piece (EN 3B). In addition, the drill produced a burr cap that was difficult to dislodge. Using the same drilling conditions and same work piece (EN 3B), a twist drill according to the present invention (i.e. very similar to the one shown in FIGS. 2A and 2B) produced holes having a much smaller burr height. In addition, fewer burr caps were produced and those that were still attached to the work piece were easily dislodged because they were connected to the substrate by only a thin piece of burr material.

Twist drills of the present invention can be used to cut a bore in a variety of metals and composites and in all cases it has been shown to reduce the exit burr height. However, the most beneficial results are exhibited with work pieces made of carbon steels, Ti, stainless steel, aluminium, copper, brass and composite materials such as carbon fibre and glass reinforced plastics. Embodiments have also led to a reduction in 'de-lamination' whilst drilling composite materials (i.e. work pieces comprising layers of different material).

In AMG 1.2 (similar to EN 3B) the exit burr height was shown to reduce by up to 80-90%. FIG. 3A shows the results of a test with a standard drill of the sort shown in FIG. 1. The standard drill produced an exit burr height of 0.8-1.0 mm. In contrast, the twist drill of the present invention, of the sort shown in FIG. 2, consistently produced an exit burr height of between 0.1-0.2 mm.

The Cutting Condition Requirements in AMG 1.2 (similar to EN 3B) are as follows:
Spindle Speed—3500 rpm
Penetration Rate—875 mm/min
Drilling Depth—39 mm The twist drill cut for about 25.5 minutes, which equates to 654 holes at the above drilling depth.

Drill Depth and Wear Studies

Tests with the twist drill of the present invention show it is capable of achieving drill times in excess of 38 minutes, using the following operational parameters.

The applicant normally recommends that a drill be capable of a drilling time of 30 minutes, so this requirement is met comfortably by the new twist drill.

Tests to establish the wear characteristics of twist drills of the present invention indicate that the cutting efficiency and failure rate of the twist drill is comparable to the performance of standard metal-working twist drills of the sort shown in FIG. 1.

Study 1

Tests were carried out with a twist drill similar to that shown in FIGS. 2A and 2B, using the following machine set up and parameters, in AMG 1.2 (similar to EN 3B):
Vertical Machining Centre
20 bar Through Tool Coolant

| | |
|---|---|
| Speed rpm | 3500 |
| Feed mm/min | 875 |
| Depth mm | 40 |

In this test, drill diameters of 10.1 mm and 8.2 mm were used for through holes.

After completing 516 holes (258 holes per billet) the cutting edge was still cutting efficiently. The exit burr height was consistently low and testing continued until drill failure.

Test results showed a large reduction in exit burr height control, whilst cutting performance was maintained.

Study 2

Multiple tests were carried out using twist drills similar to the one shown in FIGS. 2A and 2B.

The machine set up was as follows:
Vertical Machining Centre
20 bar Through Tool Coolant
7-8% Coolant Concentration The drill diameters were 8.2 mm and the optimal drilling parameters were found to be as follows:

| | |
|---|---|
| Speed rpm | 5240 |
| Feed mm/min | 1048 |
| (mm/rev) | (0.2) |
| Depth mm | 37.40 |

In each case, the 8.2 mm drills performed well with an average drill life of 38.85 meters of cut. The target was to achieve a consistent performance of at least 30 meters, and this was comfortably exceeded.

The drill produced acceptable swarf, with short chipping, in particular short start and exit chip. The productivity was good and comparable to the performance of known metal-working twist drills.

The main performance criterion was with regards to the minimised burr height and the twist drill geometry of the present invention achieved this with a consistent minimised entry and exit burr height of a maximum of about 0.1 mm. In some cases, there was an 'exit cap' produced, but this was easily removed without damage to the work piece.

As noted above, the continuing growth of carbon fibre and carbon fibre aluminium stack material in the latest aircraft designs (e.g. A380/B787/A400M/JSF) bring with it an increased need to drill this new laminate material whilst maintaining strict tool performance criteria in terms of hole size, surface finish and exit burr. These laminate materials bring with them the added difficulty of machining carbon fibre such as delamination, fraying, hole erosion, splintering and excessive tool wear.

The combination of carbon-fibre and aluminium in a laminate provides a challenge because the machining characteristics are very different for each material. Nevertheless, the use of embodiments of the twist drills of the present invention results in reduced delamination, fraying, hole erosion and splintering, as illustrated in the test below. Furthermore, increased tool life has been achieved, compared to known twist drills.

CFRP/Al Test Results (A) Prior Art Twist Drill

Figure 4A:
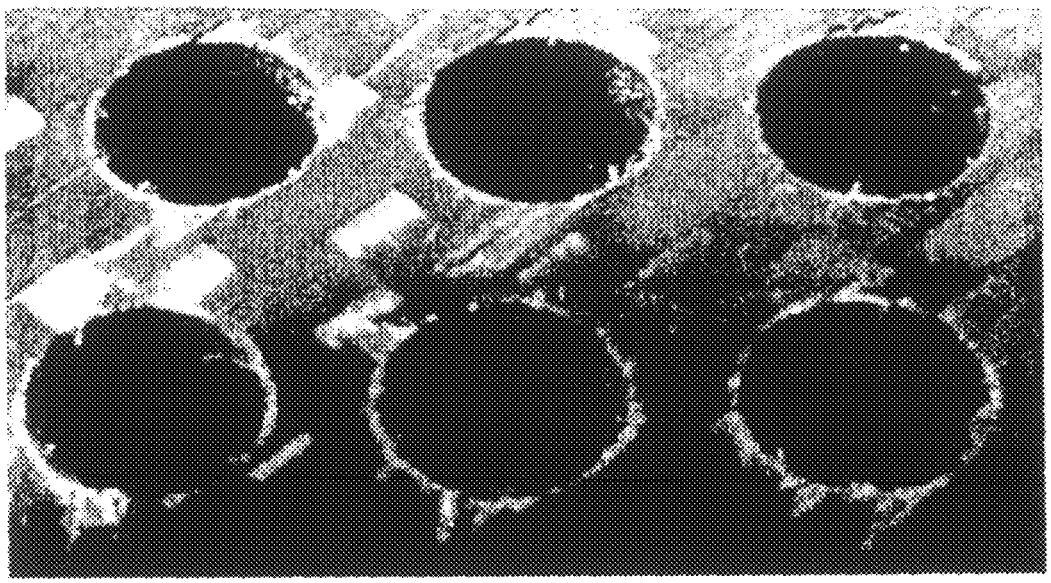
FIGS. 4A and 4B show the results of a test on CFRP/Al laminate material using a twist drill of the prior art.
Figure 4B:
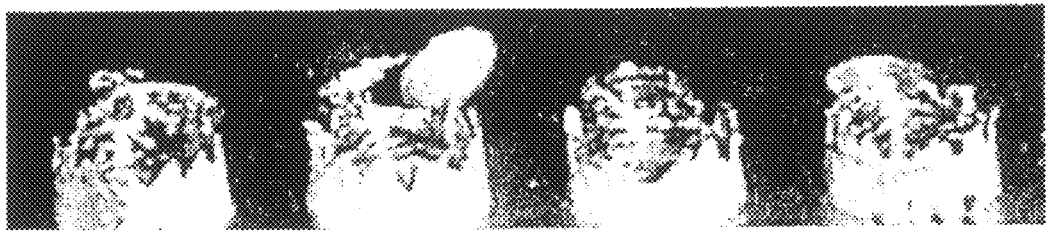

Current drill designs used by the aerospace industry do not produce the required hole specifications when drilling carbon fibre aluminium stack material (CFRP/Al). FIGS. 4A and 4B show an example of the results produced by the current drill geometries.

FIGS. 4A and 4B highlight the common problems when drilling CFRP/Al stack material with conventional twist drills:—FIG. 4A shows fraying and splintering of the CFRP material; and FIG. 4B shows large 'crowning' burrs, which are not an acceptable result when drilling.

The above tests were run at the following conditions:
Dry Drilling
Speed—3130 rpm
Feed—239 mm/min
Depth—24.0 mm (Al 12.0 mm/CFRP 12.0 mm)

A 118° conical ground point drill was used (there was no inclined outer cutting portion).

The tool life achieved with the conventional twist drills was between 10-15 holes prior to tool failure.

(B) Twist Drill of the Present Invention

Figure 5A:
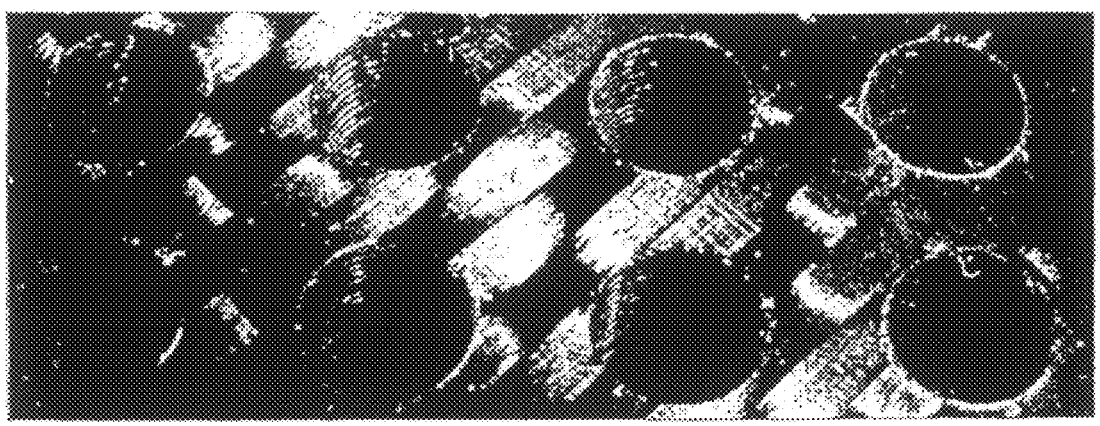
FIGS. 5A and 5B show the results of a test on CFRP/Al laminate material using a twist drill of the present invention.
Figure 5B:
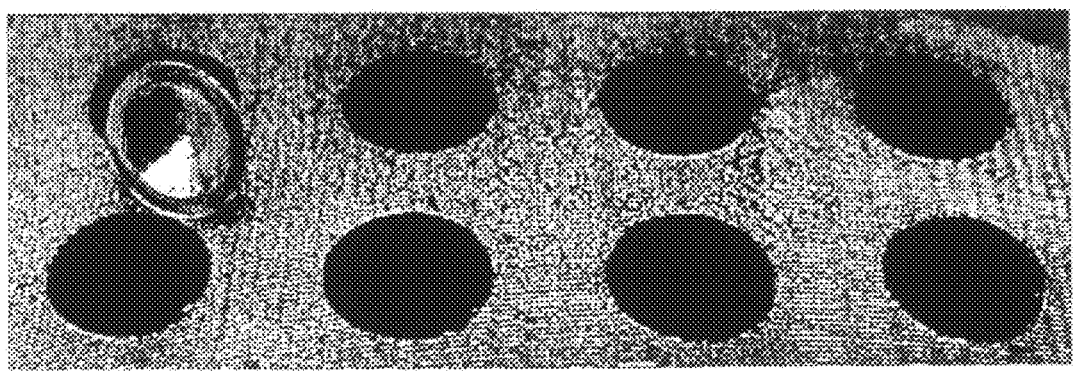

FIGS. 5A and 5B highlight the performance benefits of the new point geometry:—FIG. 5A shows minimal splintering and no fraying of the carbon fibre composite; and FIG. 5B shows no exit burr produced when exiting the aluminium.

The above results were produced using the same cutting conditions as mentioned above but using a drill similar to the one shown in FIGS. 2A and 2B. As well as the highlighted drilling benefits the tool life was also increased from 10 holes to 100 holes.

This is an improvement in tool life of 10 times the current standard.

It is to be understood that variants of the above described examples of the invention in its various aspects, such as would be readily apparent to the skilled person, may be made without departing from the scope of the invention in any of its aspects.

The invention claimed is:

1. A twist drill having
a shank,
an axis of rotation about which the twist drill rotates during use, and a cutting tip, the cutting tip having a cutting edge which has an inner cutting portion forming a point having a point angle in the range 128° to 160°, and a radially outer cutting portion that is inclined in the opposite axial direction to the inner cutting portion at an angle of from 2° to 8° with respect to a plane normal to the axis of rotation, said cutting edge being continuous over the inner and outer cutting portions and the outer cutting portion and the inner cutting portion abutting each other, the outer cutting portion being angled, relative to the inner cutting portion, such that the outer cutting portion leads the inner cutting portion in the rotational direction of cutting, the angle between the inner cutting portion and the outer cutting portion being in the range of being greater than 160° and less than 180°; and the twist drill includes a cylindrical land and the outer cutting portion extends to the outermost edge of the cylindrical land.

2. A twist drill according to claim 1, wherein the width of the outer cutting portion is in the range of 5% to 30% of the diameter of the twist drill.

3. A twist drill according to claim 2, wherein the width of the outer cutting portion is in the range of 5% to 15% of the diameter of the twist drill.

4. A twist drill according to claim 1, wherein the inner cutting portion includes two inner cutting edges, which form the point.

5. A twist drill according to claim 1, wherein the twist drill includes double helical flutes.

6. A twist drill according to claim 1, wherein the twist drill is made of tungsten carbide.

7. A twist drill according to claim 1, wherein the twist drill comprises polycrystalline diamond mounted on a metal substrate.

8. A twist drill according to claim 1, wherein the outer cutting portion and the point are joined such that a V-shaped valley or trough is formed between the point and the outer cutting portion.

9. A twist drill according to claim 1, wherein the twist drill includes a chisel edge.

10. A twist drill according to claim 1, wherein the outer cutting portion is straight.

11. A twist drill according to claim 1, wherein the outer cutting portion is curved.

12. A method of drilling a hole in a laminate material comprising fiber-containing and metal-containing layers, in order to minimize fraying and splintering of the fiber-containing material and to further minimize hole erosion and excessive tool wear, comprising the steps of:

forcing a drill into the laminate, which drill has a cutting edge which has an inner cutting portion forming a point having a point angle in the range 128° to 160° and a radially outer cutting portion that is inclined in the opposite axial direction to the inner cutting portion at an angle of from 2° to 8° with respect to a plane normal to the axis of rotation, wherein said cutting edge is continuous over the inner and outer cutting portions and the outer cutting portion and the inner cutting portion abut each other, the angle between the inner cutting portion and the outer cutting portion being in the range of being greater than 160° and less than 180°, the initial entry of the drill being in a fiber-containing layer such as to minimize fraying and splintering thereof and said drill subsequently drilling through a metal-containing layer and subsequently passing through an exit hole of the laminate material.

13. A method according to claim 12 wherein the fiber-containing layer comprises carbon fiber.

14. A method according to claim 12 wherein the metal-containing layer comprises aluminum.

15. A method according to claim 12 wherein the laminate material is a CFRP/Al material.

16. A method according to claim 12 wherein the metal-containing layer is the last layer to be drilled.

17. A method according to claim 12 wherein the laminate material comprises more than two layers.

* * * * *